US008100816B2

(12) United States Patent
 Daniel

(10) Patent No.: US 8,100,816 B2
(45) Date of Patent: Jan. 24, 2012

(54) TRAINING DEVICE FOR AN AMBULATORY USER

(75) Inventor: Steven Daniel, Buena Park, CA (US)

(73) Assignee: Leed By Example, Fullerton, CA (US)

( * ) Notice: Subject to any disclaimer, the term of this patent is extended or adjusted under 35 U.S.C. 154(b) by 0 days.

(21) Appl. No.: 11/724,598

(22) Filed: Mar. 14, 2007

(65) Prior Publication Data
US 2008/0227604 A1   Sep. 18, 2008

(51) Int. Cl.
 *A63B 21/06* (2006.01)
 *A63B 71/00* (2006.01)
(52) U.S. Cl. ......... 482/93; 482/74; 280/1.5; 280/47.131
(58) Field of Classification Search ............. 482/66–69, 482/74, 78, 93, 92, 94, 97, 105; 280/1.5, 280/47.17, 47.24, 47.131, 63, 290, 292
 See application file for complete search history.

(56) References Cited

U.S. PATENT DOCUMENTS

| | | | | | |
|---|---|---|---|---|---|
| 1,507,982 | A | * | 9/1924 | Anderson | 280/1.5 |
| 2,648,545 | A | * | 8/1953 | Cassidy | 280/42 |
| 2,756,064 | A | * | 7/1956 | Rutledge | 280/646 |
| 2,770,466 | A | * | 11/1956 | Pearson et al. | 280/646 |
| 3,328,043 | A | * | 6/1967 | Johnson | 280/1.5 |
| 4,211,426 | A | * | 7/1980 | Motloch | 280/87.041 |
| 4,236,723 | A | * | 12/1980 | Lemmon | 280/1.5 |
| 4,334,677 | A | * | 6/1982 | Tata | 482/14 |
| 4,447,056 | A | * | 5/1984 | Dalton | 473/442 |
| 5,005,844 | A | * | 4/1991 | Douglas et al. | 280/1.5 |
| 5,106,108 | A | * | 4/1992 | Howell | 280/1.5 |
| 5,167,600 | A | * | 12/1992 | Baird | 482/105 |
| 5,197,931 | A | * | 3/1993 | Wroclawsky | 482/74 |
| 5,215,355 | A | * | 6/1993 | Klumpjan | 298/6 |
| 5,244,217 | A | * | 9/1993 | Kotulla | 280/1.5 |
| 5,265,891 | A | * | 11/1993 | Diehl | 280/1.5 |
| 5,375,861 | A | * | 12/1994 | Gifford | 280/47.38 |
| 5,378,217 | A | * | 1/1995 | D'Orta | 482/111 |
| 5,622,294 | A | * | 4/1997 | Evans | 224/184 |
| 5,732,964 | A | * | 3/1998 | Durham et al. | 280/266 |
| 5,810,697 | A | * | 9/1998 | Joiner | 482/68 |
| 5,876,309 | A | * | 3/1999 | Archey | 482/66 |
| 5,951,443 | A | * | 9/1999 | Askins | 482/74 |
| 6,059,697 | A | * | 5/2000 | Breems | 482/67 |
| 6,098,993 | A | * | 8/2000 | Bellinson | 280/1.5 |
| 6,126,184 | A | * | 10/2000 | Liao | 280/47.371 |
| 6,131,917 | A | * | 10/2000 | Walsh | 280/43.1 |
| 6,431,556 | B1 | * | 8/2002 | Beardsley et al. | 280/1.5 |

(Continued)

FOREIGN PATENT DOCUMENTS

GB           2231500 A   * 11/1990

*Primary Examiner* — Loan Thanh
*Assistant Examiner* — Daniel Roland
(74) *Attorney, Agent, or Firm* — Mintz Levin Cohn Ferris Glovsky and Popeo, P.C.

(57) ABSTRACT

A training device for an ambulatory user is disclosed. The training device includes a harness to attach to the ambulatory user, a pair of wheels extending from opposite sides of a crossbar, and a weight holder connected between the crossbar and the harness. The weight holder is adapted to hold one or more removable weights. The training device can further include an elongated shock absorber connected to the harness to absorb compressive and expansive forces exerted on the harness at least in part by the ambulatory user.

14 Claims, 4 Drawing Sheets

U.S. PATENT DOCUMENTS

| | | | |
|---|---|---|---|
| 6,592,497 B2* | 7/2003 | Greenheck | 482/93 |
| 6,652,427 B2* | 11/2003 | Wroclawsky | 482/111 |
| 6,671,926 B2* | 1/2004 | Huang | 16/35 R |
| 6,918,855 B2* | 7/2005 | Dumont | 482/51 |
| 7,001,313 B1* | 2/2006 | Crnkovich | 482/68 |
| 7,007,956 B1* | 3/2006 | Pinon | 280/1.5 |
| 7,083,175 B1* | 8/2006 | Liu | 280/47.38 |
| 7,297,090 B2* | 11/2007 | Torres | 482/74 |
| 7,311,313 B1* | 12/2007 | Ray et al. | 280/1.5 |
| 2002/0119872 A1* | 8/2002 | Greenheck | 482/93 |
| 2005/0164850 A1* | 7/2005 | Leibowitz | 482/93 |
| 2005/0272572 A1* | 12/2005 | Lewis | 482/93 |
| 2006/0055128 A1* | 3/2006 | Scott et al. | 280/1.5 |
| 2007/0187910 A1* | 8/2007 | Adams | 280/1.5 |
| 2007/0290460 A1* | 12/2007 | Girard et al. | 280/1.5 |
| 2008/0018063 A1* | 1/2008 | Morowat | 280/1.5 |

* cited by examiner

TRAINING DEVICE FOR AN AMBULATORY USER

BACKGROUND

Being ambulatory, such as running and walking, is a universal and timeless mode of exercise and sport. Training regimes for improving ambulatory movement are many, but most involve simply more of either running or walking, often with some sort of structured workout such as repeated cycles of distance and/or pace, timed distances, hill training, and other measured, controlled workouts.

Some runners and walkers augment such ambulatory workouts with weight-lifting or static resistance training using a resistance-providing machine. For example, some runner and walkers workout on weight benches to build muscle, particularly leg muscle. The resistance provided by such machines increases the normal gravitational resistance experienced by a person.

However, using enhanced resistance while moving in a natural ambulatory setting has proven difficult. Some runners and walkers have used weights that are placed at their ankles or on their wrists. But such weights alter the person's natural gait and tempo, which is difficult to adjust to when the weights are not used.

SUMMARY

This document discloses a training device that provides weighted resistance to an ambulatory user (i.e. runner or walker), while still providing near-total freedom of movement and absorption of unforeseen or uncontrollable resistive shock. In preferred implementations, the training device is adapted to be pulled behind a runner or walker, and can accommodate variable loads of weights for customized, dynamic resistance and enhanced training effectiveness.

In one aspect, the training device includes a harness to attach to the ambulatory user, a pair of wheels extending from opposite sides of a crossbar, and a weight holder connected between the crossbar and the harness. The weight holder is adapted to hold one or more removable weights. The training device can further include an elongated shock absorber connected to the harness to absorb compressive and expansive forces exerted on the harness at least in part by the ambulatory user.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
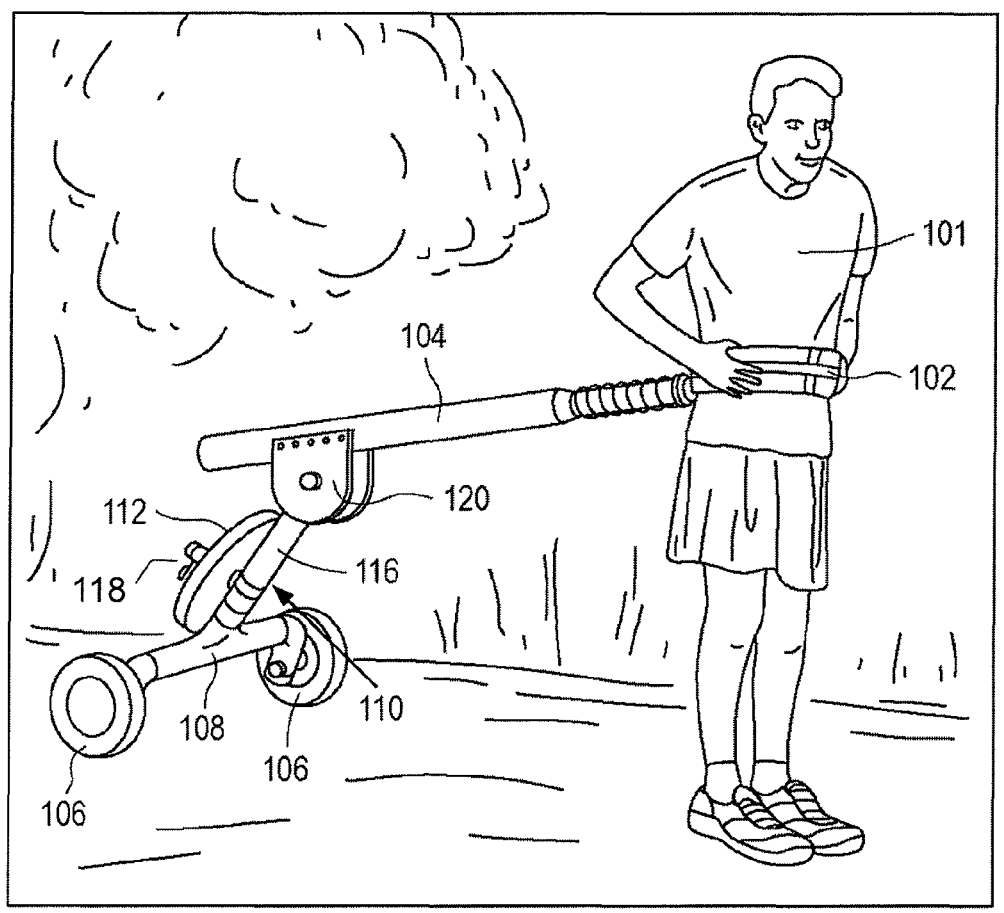
FIG. 1 is a front side perspective view of a training device being used by an ambulatory user.
Figure 2:
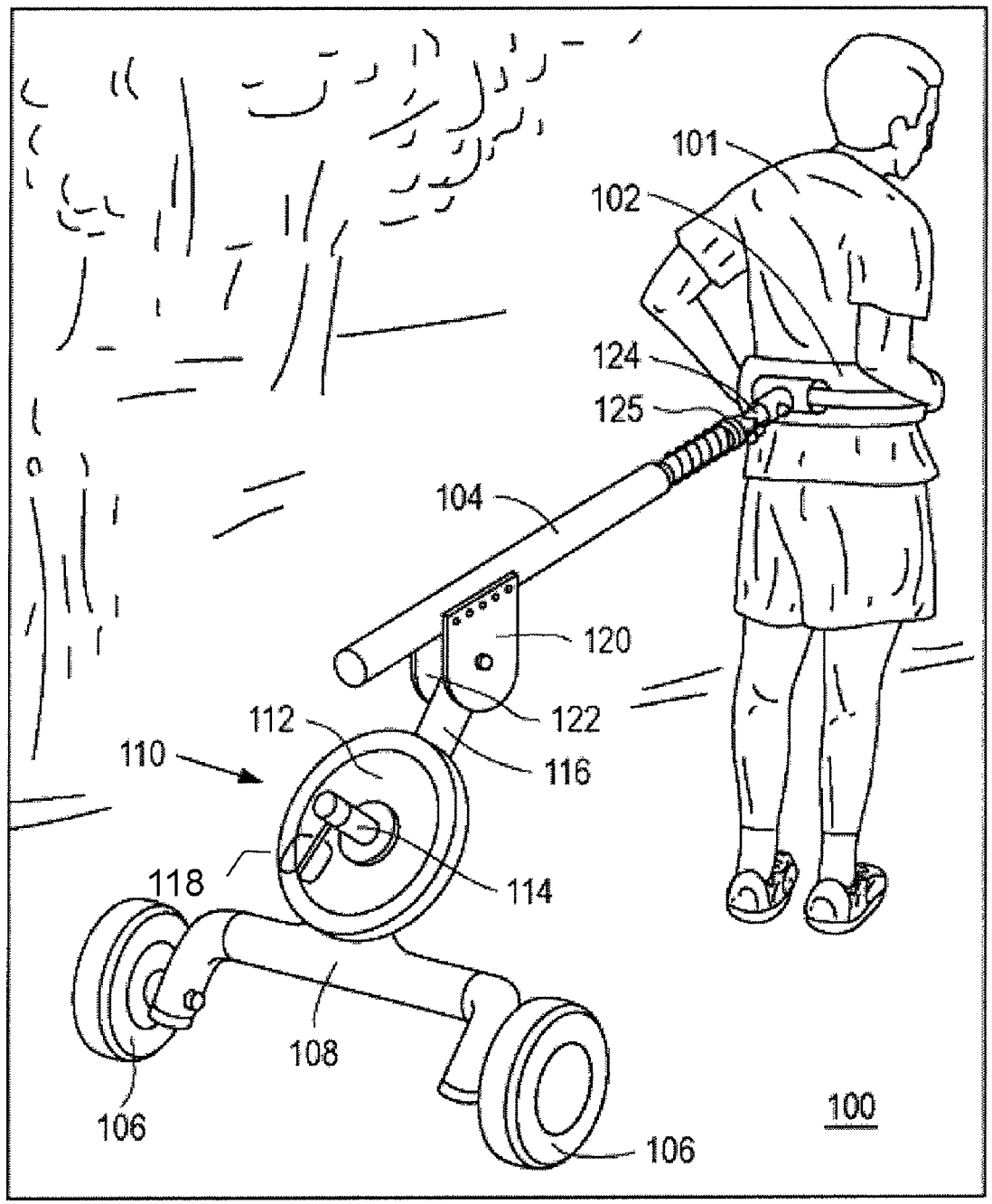
FIG. 2 is a rear side perspective view of a training device being used by an ambulatory user.
Figure 3:
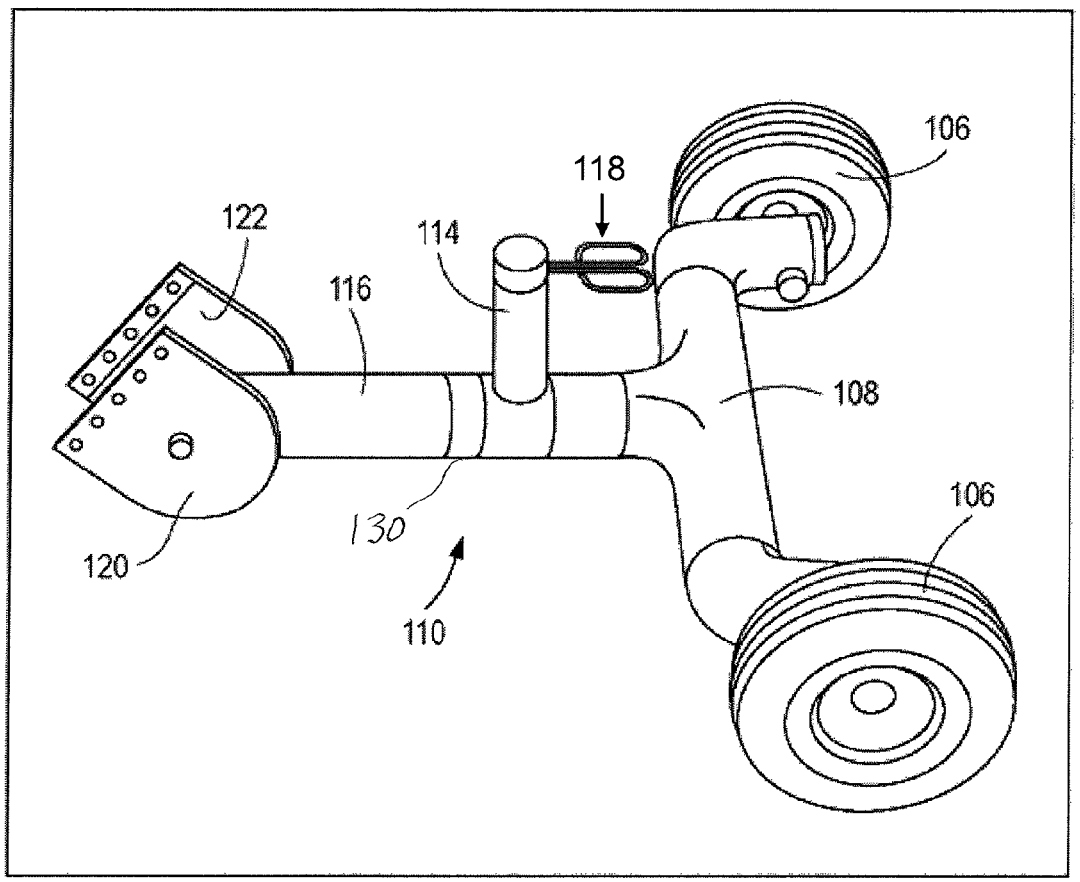
FIG. 3 shows a weight holder and crossbar with wheels of a training device.

With reference to FIGS. 1-3, a training device 100 is shown and described that is adapted to be pulled behind an ambulatory user 101. Alternatively, the training device 100 can be configured to be pushed in front of the ambulatory user 101.

The training device 100 include a harness 102 to attach to the ambulatory user, and a shock absorber 104 connected to the harness 102 to absorb compressive and expansive forces exerted on the harness 102 at least in part by the ambulatory user 101. The harness 102 can include a padded belt that is adapted to connect around the waist of the ambulatory user. In some implementations, the shock absorber 104 is elongated, and preferably tubular, and can include a number of integrated springs or other shock absorbing components. For example, the shock absorber 104 can use pneumatic pressure or other fluidic pressure to absorb and resist the compressive and expansive forces exerted on the harness 102. In alternative implementations, the shock absorber 104 includes separate compressive and expansive shock absorbers.

The training device 100 further includes at least two wheels 106, preferably extending from opposite sides of a crossbar 108 that is connected to the shock absorber 104. The wheels 106 allow the training device 100 to roll as well as absorb shock that may arise, for example, from variations in a terrain over which the ambulatory user moves. The wheels 106 can be of any diameter, and preferably between 8 and 24 inches in diameter, and can include an air-filled inner tube. The cross bar 108 can be straight, curved or a V-shaped bar.

The training device 100 further includes a weight holder 110 connected between the crossbar 108 and/or wheels 106 and the shock absorber 104, to hold one or more removable weights 112. In some implementations, the weight holder 110 includes a pin 114 extending from a center bar 116, the pin 114 being sized to receive the one or more of the removable weights 112, where each of the one or more removable weights 112 includes an aperture. The pin 114 can be formed at an angle from the center bar 116, and can further include a cotter 118 to hold the one or more removable weights 112 on the pin 114. In some alternative implementations, the center bar 116 can include a second shock absorber 130 to absorb a compressive force exerted between the wheels 106 and the shock absorber 104.

Figure 4:
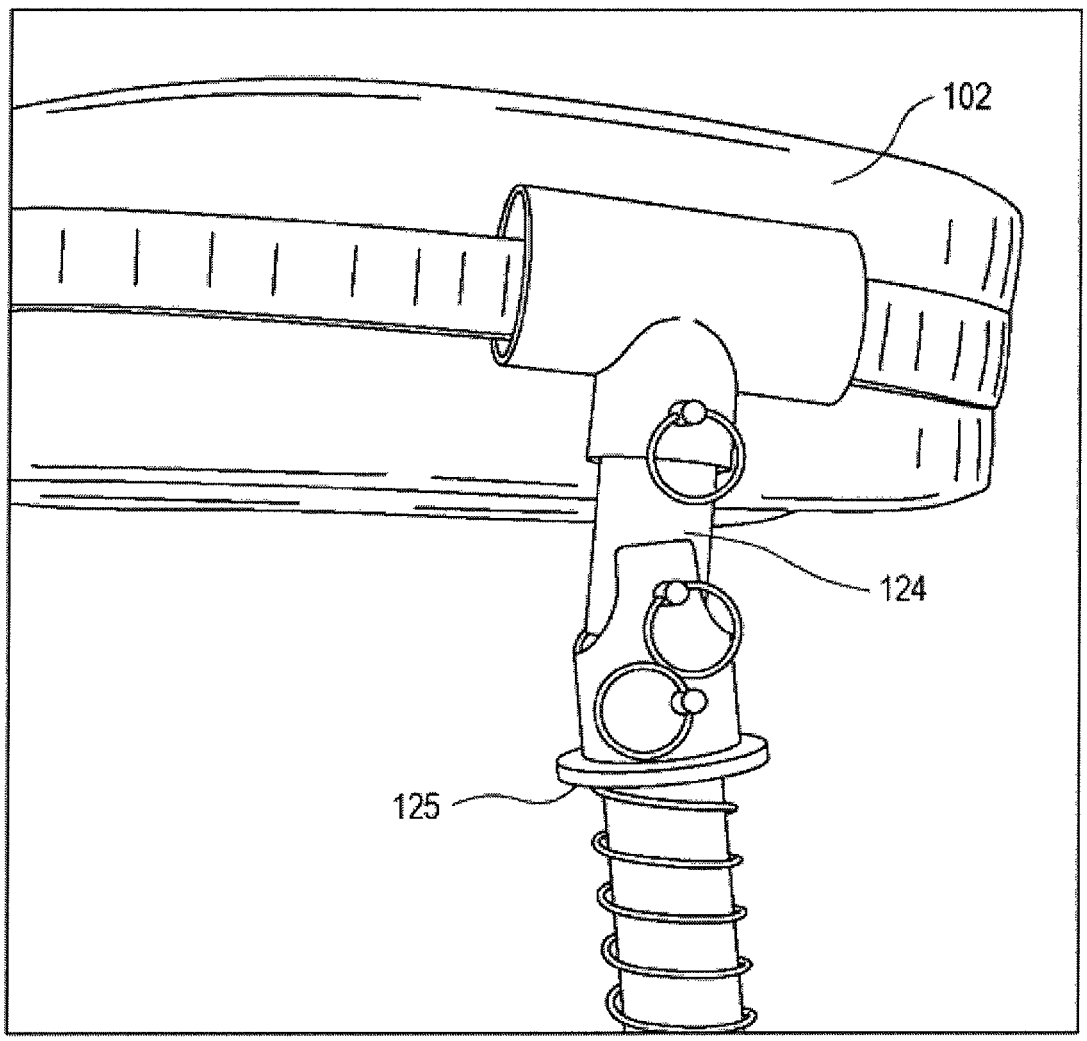
FIG. 4 shows an articulated connector that connects a harness with a shock absorber to allow multidimensional freedom of movement to an ambulatory user.

In some implementations, the training device 100 can include a hinge 120 that connects the center bar 116 of the weight holder 110 at a desired angle relative to the shock absorber 104. The hinge 120 can include a hinge pin 122 to lock the center bar 116 at the desired angle. As shown in FIG. 1 and FIG. 2, the center bar 116 can be aligned at a first angle relative to the plane upon which the wheels 106 are resting while the shock absorber 104 can be aligned at a second angle relative to this plane. The second angle can be more acute than the first angle as shown in FIG. 1 and FIG. 2. In other words, the shock absorber can be closer to parallel to the plane than the center bar is. Still in other implementations, as shown in FIG. 4 in particular, the training device 100 can further include an articulated connector 124 connected between a distal end 125 of the shock absorber 104 and the harness 102. The articulated connector 124 can have at least two planes of articulation to allow the ambulatory user to run in many desired directions while freely pulling the training device 100.

Components of the training device 100 can be made of various materials. Plastics, carbon composite materials, and/or metals like aluminum can be used for certain components such as the shock absorber 104, crossbar 108, and weight holder 110. The components of the training device 100 can be tubular, or having a more angular cross-section. The training device 100 can be made to a specific weight so as to provide further resistance against the directional movement of the ambulatory user. Alternatively, the weighted resistance can be almost entirely dependent on the number and type of weights carried by the weight holder 110.

Although a few embodiments have been described in detail above, other modifications are possible. For example, the crossbar 108 and weight holder 110 can be formed of a single unitary piece to which at least two wheels are connected, and which is also connected to the shock absorber 104. In other implementations, the shock absorber 104 can be integrated with the weight holder 110 and/or crossbar 108 in a curved or straight, rigid or semi-rigid configuration. For instance, the components of the training device 100 can be designed and made to fold up into a compact shape for easy storage and transport. Other embodiments may be within the scope of the following claims.

What is claimed:

1. A training device comprising:
a harness to attach to an ambulatory user;
an elongated shock absorber connected to the harness to absorb compressive and expansive forces exerted linearly along an axis through the elongated shock absorber on the harness at least in part by the ambulatory user;
a pair of wheels extending from opposite sides of a crossbar, the wheels being sized between 8 and 24 inches in diameter to roll and absorb shock from a terrain over which the ambulatory user moves;
a weight holder connected between the crossbar and the elongated shock absorber, the weight holder comprising a center bar to hold one or more removable weights for providing weighted resistance to the ambulatory user; and
an adjustable hinge that connects the center bar at a desired angle to the elongated shock absorber, the desired angle causing the center bar to be directed downward to the crossbar relative to the elongated shock absorber, the adjustable hinge allowing the training device to be folded about the adjustable hinge to a storage angle that provides the training device in a contact shape, wherein the elongated shock absorber can touch the crossbar.

2. A training device in accordance with claim 1, wherein the weight holder further comprises a pin extending from the center bar, the pin being sized to receive the one or more removable weights, wherein each of the one or more removable weights includes an aperture.

3. A training device in accordance with claim 1, wherein the weight holder includes a second shock absorber to absorb a compressive force exerted between the pair of wheels and the elongated shock absorber.

4. A training device in accordance with claim 2, wherein the pin is formed at an angle from the center bar, and further includes a cotter to hold the one or more removable weights thereon.

5. A training device in accordance with claim 1, wherein the harness includes a padded belt.

6. A training device in accordance with claim 1, further comprising an articulated connector connected between a distal end of the elongated shock absorber and the harness, the articulated connector having at least two planes of articulation.

7. A training device in accordance with claim 1, wherein each wheel of the pair of wheels includes an air-filled inner tube.

8. A training device in accordance with claim 1, wherein the hinge includes a hinge plate to lock the center bar at a desired angle to the elongated shock absorber.

9. A training device comprising:
a harness to attach to an ambulatory user;
a compressive and expansive shock absorber connected to the harness to absorb forces linearly exerted on the harness along an axis through the elongated shock absorber at least in part by the ambulatory user;
a weight holder connected to the shock absorber to hold one or more removable weights for providing weighted resistance to the ambulatory user, the weight holder comprising a center bar;
a crossbar connected to the weight holder;
a pair of wheels extending from opposite sides of the crossbar to allow the training device to be rolled behind the ambulatory user, the wheels being sized between 8 and 24 inches in diameter to roll and absorb shock from a terrain over which the ambulatory user moves; and
a hinge that connects the center bar at a desired angle to the elongated shock absorber, the hinge forming an angle between the elongated shock absorber and the center bar such that the center bar is directed downward toward the crossbar relative to the elongated shock absorber, the hinge allowing the training device to be folded to a storage angle about the hinge that provides the training device in a contact shape, wherein the elongated shock absorber can touch the crossbar.

10. A training device in accordance with claim 9, wherein the weight holder further comprises a pin extending from the center bar, the pin being sized to receive the one or more removable weights, wherein each of the one or more removable weights includes an aperture.

11. A training device in accordance with claim 9, wherein the center bar further comprises a second shock absorber to absorb a compressive force exerted between the pair of wheels and the elongated shock absorber.

12. A training device in accordance with claim 10, wherein the pin is formed at an angle from the center bar, and further includes a cotter to hold the one or more removable weights thereon.

13. A training device in accordance with claim 9, further comprising an articulated connector connected between a distal end of the elongated shock absorber and the harness.

14. A training device in accordance with claim 9, wherein the hinge includes a hinge plate to lock the center bar at the desired angle to the elongated shock absorber.

* * * * *